United States Patent
Chen et al.

(10) Patent No.: US 11,240,163 B2
(45) Date of Patent: Feb. 1, 2022

(54) PRACTICAL OVERLAY NETWORK LATENCY MEASUREMENT IN DATACENTER

(71) Applicant: VMware, Inc., Palo Alto, CA (US)

(72) Inventors: Haoran Chen, Beijing (CN); Ming Shu, Beijing (CN); Xi Cheng, Beijing (CN); Feng Pan, Beijing (CN); Xiaoyan Jin, Beijing (CN); Caixia Jiang, Beijing (CN); Qiong Wang, Beijing (CN); Qi Wu, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/806,771

(22) Filed: Mar. 2, 2020

(65) Prior Publication Data
US 2021/0226898 A1 Jul. 22, 2021

(30) Foreign Application Priority Data

Jan. 17, 2020 (WO) ................ PCT/CN2020/072739

(51) Int. Cl.
*H04L 12/841* (2013.01)
*H04L 12/721* (2013.01)
*H04L 12/715* (2013.01)
*H04L 12/26* (2006.01)
*H04L 29/06* (2006.01)
(Continued)

(52) U.S. Cl.
CPC ........ *H04L 47/283* (2013.01); *H04L 43/0852* (2013.01); *H04L 45/38* (2013.01); *H04L 45/64* (2013.01); *H04L 49/70* (2013.01); *H04L 49/90* (2013.01); *H04L 69/22* (2013.01)

(58) Field of Classification Search
CPC ......... H04L 45/38; H04L 49/90; H04L 69/22; H04L 49/70; H04L 43/0852; H04L 45/64
See application file for complete search history.

(56) References Cited

U.S. PATENT DOCUMENTS

| | | |
|---|---|---|
| 2009/0116497 A1 | 5/2009 | Varma et al. |
| 2011/0055389 A1 | 3/2011 | Bley |
| (Continued) | | |

FOREIGN PATENT DOCUMENTS

EP          1931084 A1 *  6/2008  ......... H04L 43/0852

OTHER PUBLICATIONS

Non-Published Commonly Owned Related U.S. Appl. No. 16/806,783 with similar specification, filed Mar. 2, 2020, 38 pages, VMware, Inc.

*Primary Examiner* — Mohamed A Kamara
(74) *Attorney, Agent, or Firm* — Adeli LLP

(57) ABSTRACT

Some embodiments provide a method of identifying packet latency in a software defined datacenter (SDDC) that includes a network, several host computers executing several machines, and a set of one or more controllers. At the set of controllers, the method o receives, from a set of host computers, (i) a first set of time values associated with multiple packet processing operations performed on packets sent by a set of machines executing on the set of host computers and (ii) a second set of time values associated with packet transmission between host computers through the SDDC network. The method processes the first and second sets of time values to identify a set of latencies experienced by multiple packets processed and transmitted in the SDDC.

22 Claims, 10 Drawing Sheets

(51) Int. Cl.
*H04L 12/931* (2013.01)
*H04L 12/861* (2013.01)

(56) References Cited

U.S. PATENT DOCUMENTS

| | | | |
|---|---|---|---|
| 2014/0348184 A1* | 11/2014 | Kure | H04L 65/4084 |
| | | | 370/503 |
| 2016/0205174 A1* | 7/2016 | Pitio | G06Q 40/04 |
| | | | 709/201 |
| 2016/0226742 A1* | 8/2016 | Apathotharanan | H04L 43/106 |
| 2016/0323166 A1* | 11/2016 | Pandey | H04L 43/0852 |
| 2016/0359712 A1 | 12/2016 | Attar et al. | |
| 2017/0093677 A1* | 3/2017 | Skerry | H04L 43/106 |
| 2017/0324778 A1* | 11/2017 | Register | H04L 43/0864 |
| 2019/0190804 A1* | 6/2019 | Tang | H04L 43/0852 |
| 2019/0306060 A1 | 10/2019 | Sharma | |
| 2020/0186453 A1* | 6/2020 | Zhang | H04L 41/083 |
| 2021/0226875 A1 | 7/2021 | Chen et al. | |

* cited by examiner

PRACTICAL OVERLAY NETWORK LATENCY MEASUREMENT IN DATACENTER

BACKGROUND

Novel applications such as stock trade, e-commerce, autonomous driving, and Internet of Things (IoT) are driving today's fast development of emerging technologies (e.g., 5G and edge computing). In addition to substantial computational resources, such applications have stringent requirements for network performance in terms of latency. High latency hinders user experience for certain applications, and even leads to business loss in some cases. A large number of network issues in data center are relevant to network latency. Hence, a practical network latency measurement tool is crucial for not only troubleshooting, but also optimization on network configurations and application workloads. Previous researches mainly focus on latency measurement approaches for physical networks. However, considering that most applications for datacenters are running in virtualized environments, latency measurement for virtual networks is an important problem which has not been addressed sufficiently.

BRIEF SUMMARY

Some embodiments provide a method of identifying packet latency in a software-defined datacenter (SDDC) that includes several host computers executing several machines, and a network that connects the host computers. At a first host computer, the method identifies and stores several time values associated with several packet processing operations performed on a particular packet sent by a first machine executing on the first host computer. The method identifies and stores a time value associated with a packet's transmission through the SDDC network from the first host computer to a second host computer that is a destination of the particular packet. The method provides the stored time values to a set of one or more controllers, which then processes these values along with other values that it collects from other host computers to identify latencies experienced by different packets that are processed and forwarded in the SDDC.

In some embodiments, the packet processing operations that are performed on the particular packet include middlebox service operations and packet forwarding operations. The time value that is identified and stored for each such operation in some embodiments is the length of time that it takes to perform the operation. Examples of middlebox service operations in some embodiments include firewall operations, load balancing operations, intrusion detection operations, and intrusion prevention operations.

Examples of forwarding operations in some embodiments include switching operations and routing operations. In addition to the middlebox service operations and forwarding operations, some embodiments additionally include packet processing operations performed by a virtual network interface card (VNIC) and/or by a physical network interface card (PNIC). Operations performed by VNICs and/or PNICs in some embodiments include, for example, ingress and egress processing operations. In some embodiments, time values associated with operations performed by VNICs and PNICs are collected by default, while time values associated with other operations performed on the packet are collected based on user-preference (e.g., configured by a network administrator). The collected and stored time values, in some embodiments, are used to calculate latency for each individual process which, in turn, can be used to identify a most time-consuming segment in the packet processing operations.

In some embodiments, when the particular packet is identified as belonging to a packet flow, the method samples a subset of the packets in the packet flow (e.g., 1 out of every n packets) to obtain additional data for latency identification. For each of the subset of sampled packets in some embodiments, the method identifies and stores several time values corresponding to the packet processing operations of each sampled packet. Using the stored time values of the subset of sampled packets, the method computes an average latency for each packet processing operation according to some embodiments.

For some embodiments in which the particular packet is identified as belonging to a packet flow, the method provides to the controller set a flow identifier identifying the packet flow of the particular packet in addition to providing the stored time values. The controller set, in some embodiments, uses the flow identifier to correlate time values collected from the first host computer with time values collected from the second host computer, thereby allowing the controller set to identify latencies experienced by the particular packet as the packet traverses between the first machine executing on the first host computer and a second machine executing on the second host computer.

The process of identifying and storing a time value associated with the packet's transmission through the SDDC network, in some embodiments, additionally includes identifying and storing a time value associated specifically with the packet's forwarding to the second host computer through the network (e.g., a sending timestamp). In some embodiments, this time value is used to calculate a round-trip time of a path of the packet. This calculated round trip time in some embodiments is used to identify and measure latency of the network.

In some embodiments, the particular packet is a control packet in a set of control packets exchanged between the first and second host computers. The identified and stored time value associated with the control packet's transmission, in some such embodiments, is a time value for exchanging control packets between the first and second host computers. Control packets may be used in addition to, or in place of sampling a subset of packets for time values in some embodiments.

In some embodiments, bidirectional forwarding detection (BFD) packets are leveraged as the probing/control packet mechanism to gauge availability of a tunnel between the first and second host computers. As each endpoint (i.e., host computer) sends BFD packets independently at a regular interval in some embodiments, a BFD packet is extended in order to include additional fields. For instance, some embodiments insert a sending timestamp corresponding to the time value associated with the BFD packet's transmission through the network to the second host computer. In some embodiments, a physical NIC (PNIC) of the first host computer (i.e., source host computer) inserts the sending timestamp in the extended BFD packet at the time of forwarding the BFD packet to the second host computer (i.e., destination host computer) through the network.

After receiving and processing the BFD packet sent by the first host computer in some embodiments, the second host computer forwards a reply packet with extended fields to the first host computer. In some embodiments, the second host computer inserts in the extended reply packet (i) a sending timestamp corresponding to a time value associated with the reply packet's forwarding through the network to the first host computer, (ii) an idle interval corresponding to a time interval during which the BFD packet was being processed at the second host computer, and (iii) a piggybacked timestamp consisting of the sending timestamp from the received BFD packet.

In some embodiments, when the first host computer receives the reply packet from the second host computer, the first host computer identifies and stores a time value associated with the receipt of the reply packet. The first host computer uses the receipt time value to calculate a round-trip time for the entire network path traversed by the packets in some embodiments by subtracting the piggybacked timestamp and the idle interval from the identified time value associated with the receipt of the reply packet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

DETAILED DESCRIPTION

Some embodiments provide a method of identifying packet latency in a software-defined datacenter (SDDC) that includes several host computers executing several machines, and a network that connects the host computers. At a first host computer, the method identifies and stores several time values associated with multiple stages of packet processing operations performed on a particular packet sent by a first machine executing on the first host computer. The method identifies and stores a set of time values associated with a packet's transmission through the SDDC network from the first host computer to a second host computer that is a destination of the particular packet. The method provides the stored time values to a set of one or more controllers, which then processes these time values along with other time values that it collects from other host computers to identify latencies experienced by different packets that are processed and forwarded in the SDDC.

Figure 1:
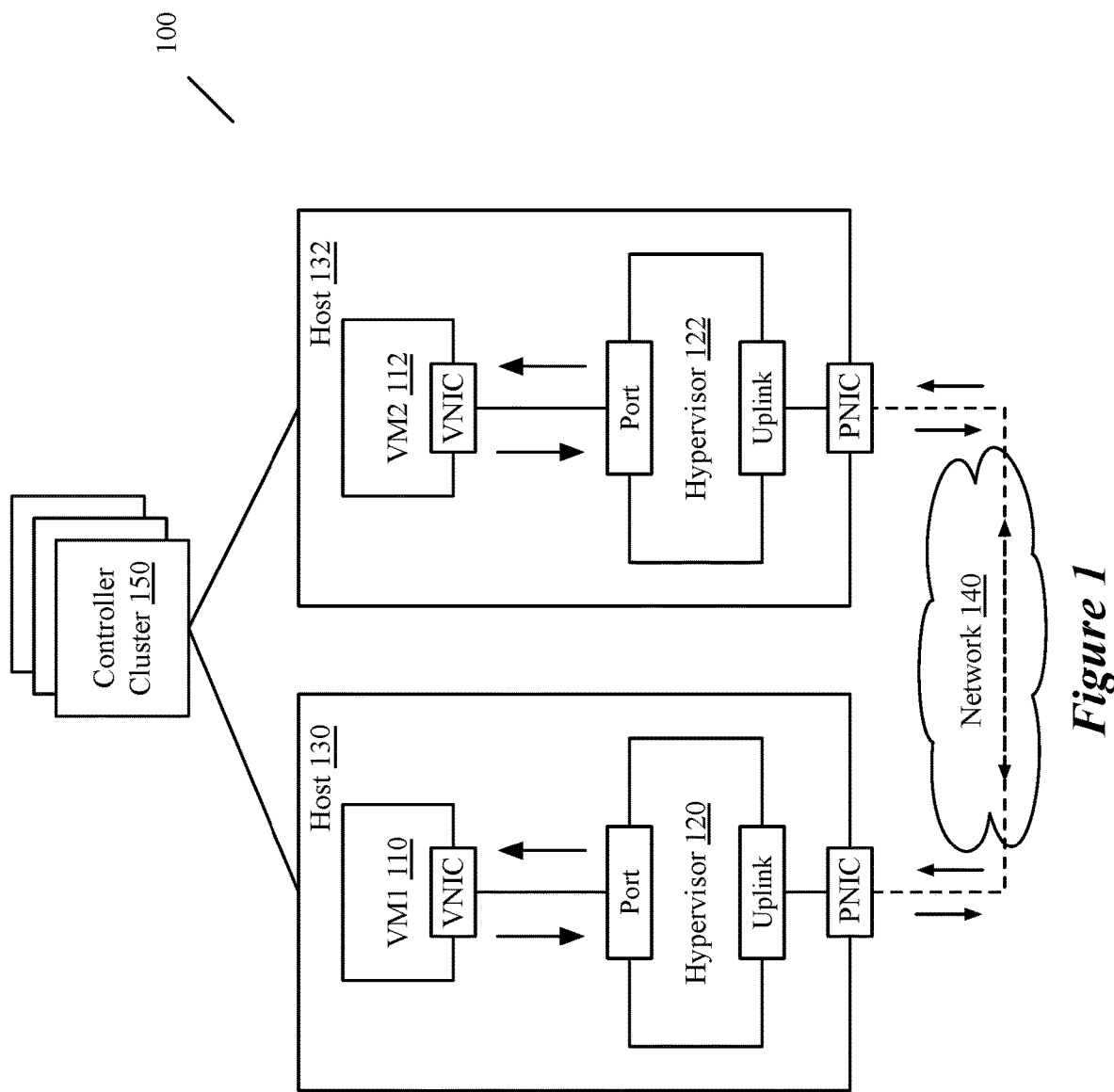
FIG. 1 conceptually illustrates an example embodiments of a software-defined datacenter (SDDC).

FIG. 1 illustrates an example of an SDDC 100 that includes a first host computer 130, a second host computer 132, a controller cluster 150, and a network 140. As shown, each host computer 130-132 includes a virtual machine (VM) 110-112 and a hypervisor 120-122. The hypervisors 120-122, in some embodiments, are virtual switches (vSwitches) of hypervisors. In some embodiments, such as the SDDC 100, each hypervisor includes (i) a port connecting the hypervisors 120-122 to the VNICs of their respective VMs 110-112 and (ii) an uplink connecting the hypervisors 120-122 to the PNICs of the host computers 130-132 for transmitting packets through the network 140. The controller cluster 150 in some embodiments is responsible for establishing and configuring the SDDC 100. Additional functions of the controller cluster 150 will be discussed in further detail below, particularly with reference to FIG. 7.

In some embodiments, after a packet sent by a VM (e.g., VMs 110-112) is received at a port of a hypervisor (e.g., a port of a software switch of a hypervisor) and before the packet is transmitted from an uplink of the hypervisor (e.g., an uplink of a software switch of the hypervisor) to a PNIC of the host computer for transmission through the network 140, additional packet processing operations are performed on the packet. In some embodiments, these packet processing operations include middlebox service operations and packet forwarding operations. Examples of middlebox service operations in some embodiments include firewall operations, load balancing operations, intrusion detection operations, and intrusion prevention operations. Examples of packet forwarding operations, in some embodiments, include packet switching operations and packet routing operations. In addition to the middlebox service operations and forwarding operations, some embodiments also include packet processing operations performed by a VNIC of a VM that connects to a port of the hypervisor, and packet processing operations performed by a PNIC of the host computer that connects to a port or uplink of the hypervisor (e.g., the VNICs and PNICs illustrated in FIG. 1). Operations performed by VNICs and/or PNICs in some embodiments include, for example, ingress and egress processing operations.

The time values that are identified and stored for each such operation in some embodiments include the length of time that it takes to perform the operation. In some embodiments, the time values that are identified and stored include timestamps for the operation start time and the operation end time. The identified and stored timestamps for the operation start time and the operation end time, in some embodiments, can be used to identify a duration of time of an operation (e.g., by subtracting the operation start time from the operation end time). In some embodiments, time values associated with operations performed by VNICs and PNICs are collected by default, while time values associated with the performance of other operations on the packet are collected based on user preference (e.g., configured by a network administrator). The collected and stored time values, in some embodiments, are used to calculate latency for each individual packet processing operation. In some embodiments, these calculated latencies can in turn be used to identify, for example, the most time-consuming stages in the packet processing operations.

Figure 2:
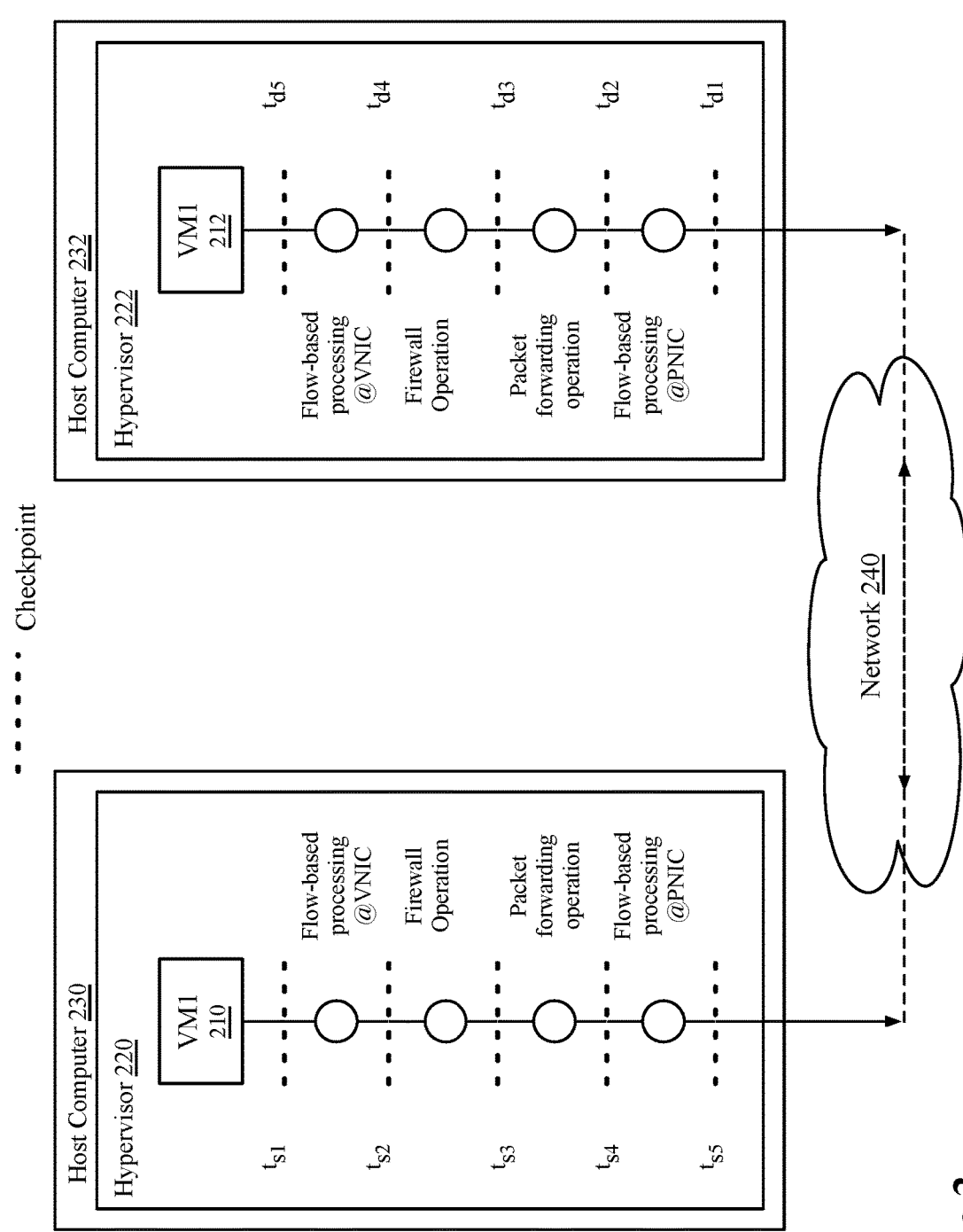
FIG. 2 conceptually illustrates an example of checkpoints enabled in hypervisors for a simplified flow of a packet between host computers in an SDDC according to some embodiments.

In some embodiments, enabling additional operations/processes results in non-negligible runtime overhead for which latency measurements must be calculated in order to optimize performance. FIG. 2 illustrates an example embodiment of an SDDC 200, similar to the SDDC 100. The SDDC 200 includes a set of host computers 230-232 that each include a VM 210-212 and a hypervisor 220-222. As shown, each of the hypervisors 220-222 include a set of packet processing operations. While the packet processing operations illustrated for each hypervisor consist of flow-based processing at the VNIC, a firewall operation, a packet forwarding operation, and flow-based processing at the PNIC, one of ordinary skill in the art will recognize that any number of different operations may be included in some embodiments (e.g., load balancing operations, intrusion detection operations, intrusion prevention operations, etc.), and further that while each of the hypervisors 220-222 are illustrated with identical and symmetrical operations, the hypervisors may include different amounts of operations and/or different types of operations.

As further illustrated, each of the packet processing operations on the hypervisors 220-222 have corresponding timestamps at each checkpoint (e.g., timestamps $t_{s1}$-$t_{s5}$ on hypervisor 220 (i.e., source hypervisor) and timestamps $t_{d1}$-$t_{d5}$ on hypervisor 222 (i.e., destination hypervisor)). Each of the timestamps recorded at these checkpoints may be used to calculate the latency a packet experiences during individual packet processing operations according to some embodiments. For example, a time duration it takes for a firewall operation to be performed on a packet can be calculated by, e.g., ($t_{s3}$-$t_{s2}$). As noted above, while the hypervisors 220-222 in the SDDC 200 are illustrated as each having four (4) processes for which time values are identified and stored, any number of processes may be enabled on each hypervisor for which times values are to be identified and stored in some embodiments.

In some embodiments, such as the example embodiment SDDC 200, in order to measure basic overall hypervisor latency, checkpoints are placed at the VNIC and the PNIC on each of the host computers 230-232, respectively. These checkpoints identify and store time values for packets in both ingress and egress directions, in some embodiments. The time difference between processing at the VNIC and processing at the PNIC (or vice versa), in some embodiments, represents the overall processing time inside of the hypervisor. Accordingly, in some embodiments, only VNIC and PNIC checkpoints are enabled by default to measure the overall hypervisor latency. In some embodiments, users can also enable additional checkpoints for other network functions (e.g., packet processing operations) on demand (e.g., customized checkpoints for processing by one or more service engines), such as those illustrated in the SDDC 200.

In some embodiments, identifying and storing time values (i.e., latency tracking) is performed only for packets of sampled flows. For example, when a packet is received at a port of a hypervisor in some embodiments, a determination is made regarding whether the packet is part of a packet flow that has been identified for latency tracking. In some embodiments, flows are randomly sampled for latency tracking, while in other embodiments, specific flows are selected (e.g., by a network administrator) for latency tracking. Selecting specific flows for latency tracking, in some embodiments, includes selecting flows for latency tracking based on flow type (e.g., VoIP).

As processing a timestamp for every single packet in a tracked packet flow would introduce substantial runtime overhead in networking (i.e., due to the potentially large number of packets in any one flow), packets are sampled in some embodiments at a sampling rate of 1/N (i.e., 1 of every N packets is involved in hypervisor latency measurement) in order to provide a practical approach in some embodiments. The sampling rate is variable and configurable (e.g., by a network administrator) according to some embodiments. The sampling is randomized in some embodiments (e.g., a random packet out of every N packets is sampled), or is sequential in other embodiments (e.g., every Nth packet is sampled).

A host computer that receives a packet flow determines, in some embodiments, whether the flow is to be tracked and how often packets of that flow are to be sampled. In some embodiments, the host computer determines whether to track a flow and how often to sample the flow based on configuration data received from the controller cluster (e.g., controller cluster 150). In other embodiments, the packets are tagged (e.g., with a tracking flag set in the packet header, such as a Geneve tunnel encapsulation header) to indicate that the flow, or even a specific packet, should be tracked. Information about how often to sample a flow is also stored in the packet header in some embodiments, e.g., a sample rate or another sampling algorithm. Accordingly, for a given flow between a source host computer and a destination host computer, the source and destination host computers track the same packets in some embodiments and different packets in other embodiments.

Figure 3:
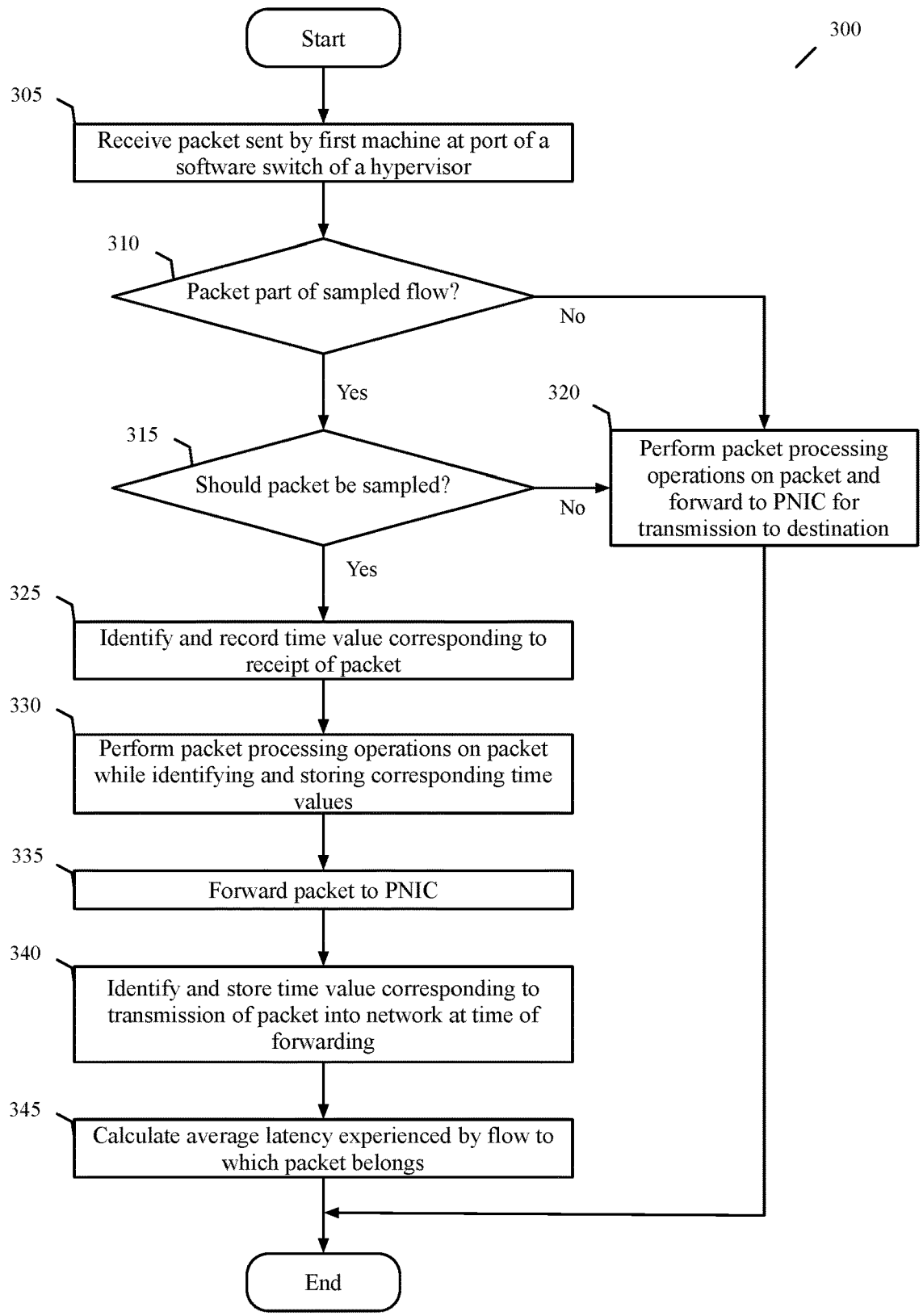
FIG. 3 illustrates a process for identifying and storing time values as a packet moves through an IOChain within a hypervisor according to some embodiments.

FIG. 3 illustrates a process 300 for processing a packet by a set of one or more packet processing operations within a hypervisor according to some embodiments. While process 300 is described below as being performed for an egress packet, in some embodiments, a similar process, for example in a different order, is also performed by the hypervisor (e.g., hypervisors 220-222) for ingress packets.

As shown, the process begins at 305 when the packet sent by a first machine on a host computer (e.g. VM1 110 on host computer 130) is received at a port of a software switch of the hypervisor operating on the host computer (e.g., hypervisor 120). The process then determines at 310 whether the packet is part of a sampled flow. Determining whether a packet is part of a sampled (i.e., tracked) flow, in some embodiments, may include determining whether the packet has a tracking flag set in its header, while in other embodiments, the sampling is based on configuration data received from a controller.

When the process 300 determines at 310 that the packet is not part of a sampled flow, the process transitions to 320 to perform packet processing operations on the packet and forward the packet to the PNIC for transmission to its destination. After 320, the process ends. Alternatively, when the process 300 determines at 310 that the packet is part of a sampled flow, the process transitions to 315 to determine whether the particular packet should be sampled. If the process determines at 315 that the packet should not be sampled, the process transitions to 320.

Otherwise, when the process 300 determines at 315 that the packet should be sampled, the process transitions to 325 to identify and record a time value corresponding to receipt of the packet (e.g., receipt at 305). The process then performs packet processing operations on the packet at 330 while identifying and storing corresponding time values. The packet processing operations in some embodiments include middlebox service operations and packet forwarding operations. For example, in some embodiment, middlebox service operations include operations performed by a firewall engine, a load balancing engine, an intrusion detection engine, and an intrusion prevention engine. The packet forwarding operations, according to some embodiments, may include, for example, packet switching operations and packet routing operations.

In some embodiments, a user (e.g., network administrator) may specify that any packet processing operations other than those performed by the VNIC and PNIC do not require time values to be stored, for example, if the user wishes to calculate the overall latency of the hypervisor and not the individual operations being performed on packets between the VNIC and PNIC. While not shown, in some such embodiments, after identifying and storing the time value corresponding to receipt of the packet, the process would perform the intervening packet processing operations without storing additional time values, and eventually forward the packet to the PNIC where a second time value would be identified and stored. An overall packet processing time for the hypervisor may then be calculated by subtracting the time value associated with receipt of the packet from the time value associated with transmission of the packet from the PNIC into the network.

Returning to process 300, once the packet processing operations have been performed on the packet and corresponding time values have been identified and stored, the process forwards at 335 the packet to the PNIC of the host computer (for transmission onto the network). Once the packet is forwarded to the PNIC, the process then identifies and stores at 340 a time value corresponding to the packet's transmission into the network at the time of forwarding.

Once the packet has been forwarded to its destination and the time values for the hypervisor processing of the packet have been stored, in some embodiments the process 300 calculates at 345 an average latency experienced for the flow to which the packet belongs. Specifically, in some embodiments, the process computes the latency for the recent packet (e.g., by subtracting the time value recorded corresponding to the receipt of the packet from the time value recorded corresponding to transmission of the packet into the network) and averages this with stored latency values computed for previous packets of the same flow. In other embodiments, the hypervisor stores only the time values for the various packets of the flow and averages these values to compute the average latency. In still other embodiments, the hypervisor stores an average latency for the flow along with a sampled packet count for the flow, and computes a new average by accounting for the one additional new sampled packet. If this is the first sampled packet of a flow and thus there are no other time values or latency values stored for the flow, latency for the individual packet is calculated (e.g., by subtracting the time value recorded corresponding to the receipt of the packet from the time value recorded corresponding to transmission of the packet into the network) and stored in some embodiments. The process then ends.

In some embodiments, multiple sets of time values corresponding to the same flow may be periodically provided to a controller set (e.g., controller cluster 150). In some such embodiments, as the controller set receives the time values, average latencies for each packet flow may be calculated such that each time a new set of time values is received for a particular flow, the controller set calculates a new average latency for the particular flow (e.g., by performing a cumulative average, a moving average, a weighted average, or other type of average). Instead of calculating average latencies on a per-flow basis, in some embodiments, the controller set calculates average latencies by averaging stored latencies calculated for multiple packet flows between a same set of host computers. In other embodiments, multiple sets of time values corresponding to the same flow may be provided to the controller set following processing of a specified number of packets of the flow (e.g., an amount specified by a user). In each of these example embodiments, the controller set maintains a current sample count in order to properly and accurately calculate the averages.

In some embodiments, the controller set calculates latency measurements for each segment of the packet processing operations performed on the packet (e.g., firewall engine latency, packet routing latency, etc.). In other embodiments, the controller set calculates overall hypervisor latency (i.e., from VNIC to PNIC). In still other embodiments, the controller set calculates both segmented latency (e.g., for any individual operations for which time values have been collected) and overall hypervisor latency. Alternatively, the hypervisor on the host computer, in some embodiments, calculates segmented latency and/or hypervisor latency on a per-packet or per-flow basis and provides a collection of calculated latencies to the controller set for calculating average latencies for the hypervisor and the packet processing operations performed therein. The hypervisor also in some embodiments aggregates the calculated latencies prior to providing them to the controller.

In some embodiments, identifying and storing time values corresponding to a packet's processing by a set of packet processing operations includes recording time values by each packet processing operation and providing these recorded time values to a first packet processing operation in the set of packet processing operations that acts as a latency tracker and ultimately provides the collected time values to the controller set. In other embodiments, the VNIC may act as the latency tracker, while in still other embodiments, a stand-alone module may be configured on the hypervisor to act as the latency tracker. In some embodiments, subsequent to performing packet processing operations on a packet, each service engine may store collected time values in a storage on the host computer.

Figure 4:
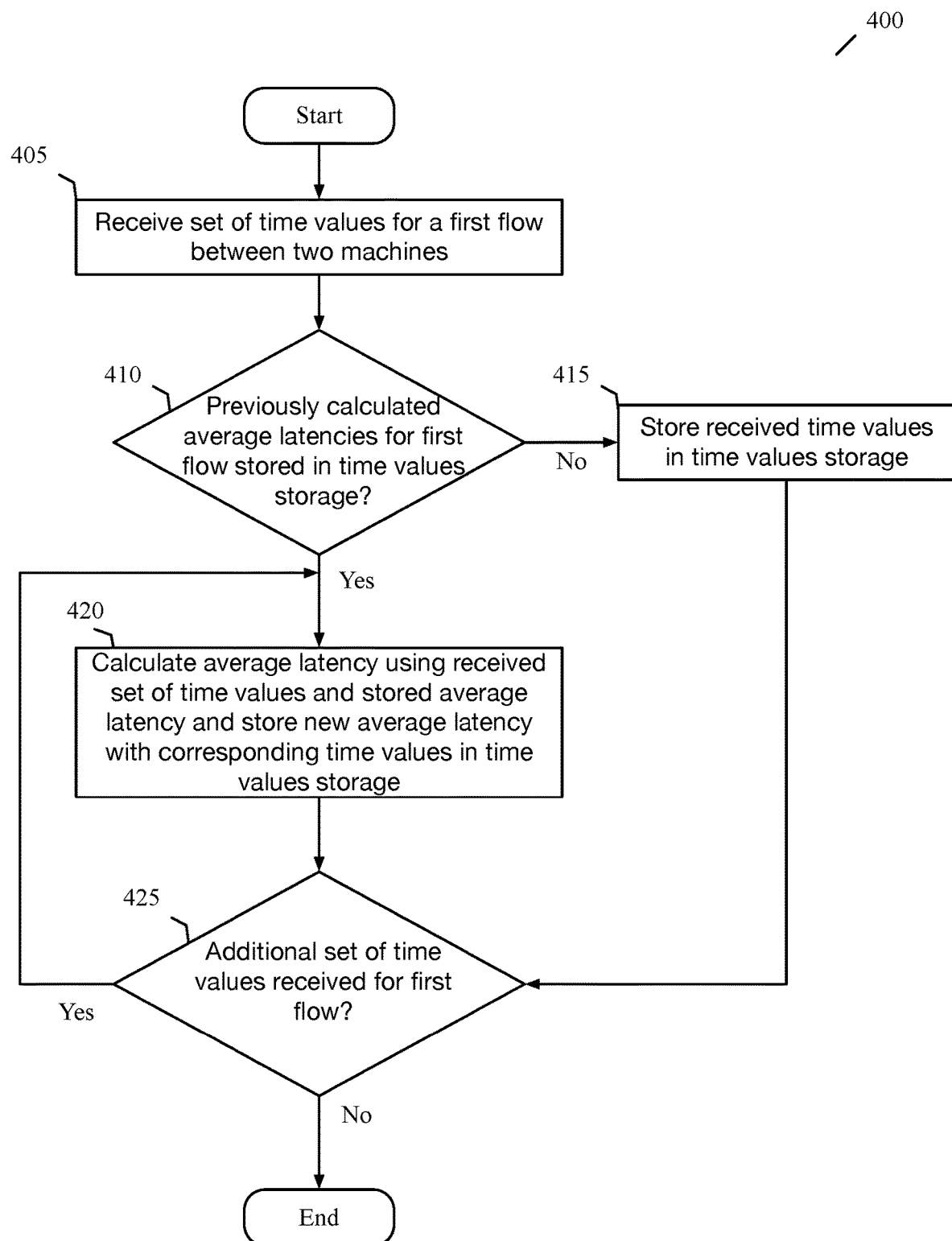
FIG. 4 illustrates a process for a controller cluster that calculates and stores average latencies according to some embodiments.

FIG. 4 conceptually illustrates a process 400 performed by a controller set (e.g., controller cluster 150) in some embodiments. The process 400 starts when the controller set receives, at 405, a set of time values for a first flow between two machines. In addition to the time values, in some embodiments, the controller set receives a corresponding sample count representing a number of packets sampled in the set of time values. In some embodiments, the set of time values may include average latencies calculated by host computers that execute the machines. In other embodiments, the set of time values may include only raw values collected on the host computers as packets of the flow traverse between the machines.

After receiving the set of times values for the first flow, the process 400 determines whether previously calculated average latencies for the first flow have been stored in the time values storage. The controller set may receive multiple sets of time values for any particular flow in some embodiments. For example, in some embodiments, the host computers may be configured to provide sets of time values at specified intervals (e.g., specified by a user) over the lifetime of the flow. In other embodiments, the host computers may be configured to provide sets of time values after processing a specified number of packets (e.g., specified by a user). It should be noted that along with any stored time values and/or stored calculated average latencies, the controller set also stores corresponding sample counts and/or stores a current sample count for each flow in order to accurately calculate new average latencies after receiving additional data.

If the process determines at 410 that there are no previously calculated average latencies for the first flow stored in the time values storage, the process transitions to 415 to store the received time values. Next, the process transitions to 425 to check for additionally received sets of time values. Alternatively, if the process determines that there are previously calculated average latencies for the first flow stored in the time values storage, the process transitions to 420 to calculate an average latency using the received set of time values and the stored average latencies and to store the newly calculated average latency along with the received time values in the time values storage. In some embodiments, for example when the received set of time values includes average latencies calculated by the host computers from which they were received, a new average latency can be calculated as ((stored average latency×stored sample count)+(received average latency×received sample count)) ÷total sample count).

After the process 400 calculates and stores the new average latency, the process then transitions to 425 to determine whether an additional set of time values has been received for the first flow. If the process determines that an additional set of time values has been received, the process returns to 420 to calculate a new average latency using the additional set of time values and the stored calculated average latency. Otherwise, if the process determines that no additional set of time values has been received, the process ends.

In some embodiments, in addition to, or in place of sampling subsets of packets in packet flows, control packets are utilized for latency identification and measurements. The stored time values for control packets, in some embodiments, are time values for exchanging control packets between first and second host computers (e.g., host computers 230-232). In some embodiments, a stored time value associated with a control packet's transmission through the network is a time value associated with a time at which the control packet is sent via the network (e.g., network 240) to the control packet's destination. This time value is referred to as a sending timestamp in some embodiments. Sending timestamps, in some embodiments, can be used to calculate round-trip path times for packets. In some embodiments, the calculated round-trip path times can then be used to identify and measure network latency.

In some embodiments, bidirectional forwarding detection (BFD) packets are leveraged as the probing/control packet mechanism to gauge availability of a tunnel between two host computers (e.g., host computers 230-232). As each endpoint (i.e., host computer) sends BFD packets independently at a regular interval in some embodiments, each of the BFD packets are extended in order to insert a sending timestamp corresponding to a time value associated with the BFD packet's transmission through the network to the second host computer. In some embodiments, a PNIC of a source host computer inserts the sending timestamp in the extended BFD packet at the time of forwarding the BFD packet to the second host computer (i.e., destination host computer) through the network (e.g., network 140).

Figure 5:
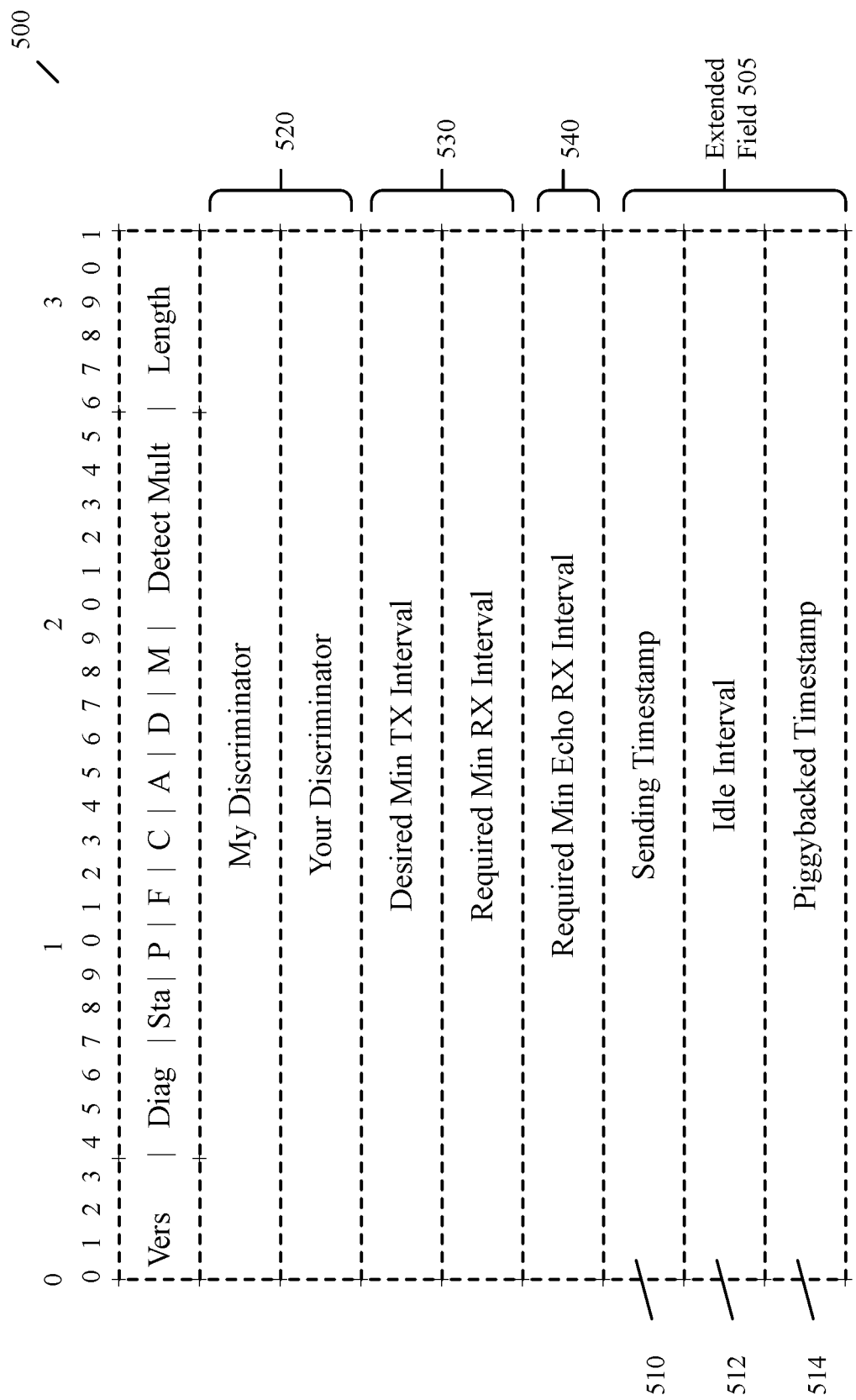
FIG. 5 illustrates an extended bi-direction forwarding detection (BFD) packet according to some embodiments.

FIG. 5 illustrates an example of an extended BFD packet 500. As shown, in addition to fields for session identifiers 520, control packet intervals 530, and echo packet interval 540, the extended BFD packet 500 includes extended field 505 for sending timestamp 510, idle interval 512, and piggybacked timestamp 514. As mentioned above, the sending timestamp 510 corresponds to a time at which a BFD packet is forwarded by a PNIC of a source to its destination, according to some embodiments. The idle interval 512 in some embodiments corresponds to a time interval between when the BFD packet is received at the destination and when the destination forwards a reply packet to a source of the BFD packet. The piggybacked timestamp 514 corresponds to the sending timestamp of the received BFD packet in some embodiments. In some embodiments, each of these timestamps inserted into the extended BFD packets are used to calculate network latency for a path traversed between a source and a destination by the BFD packets.

Figure 6:
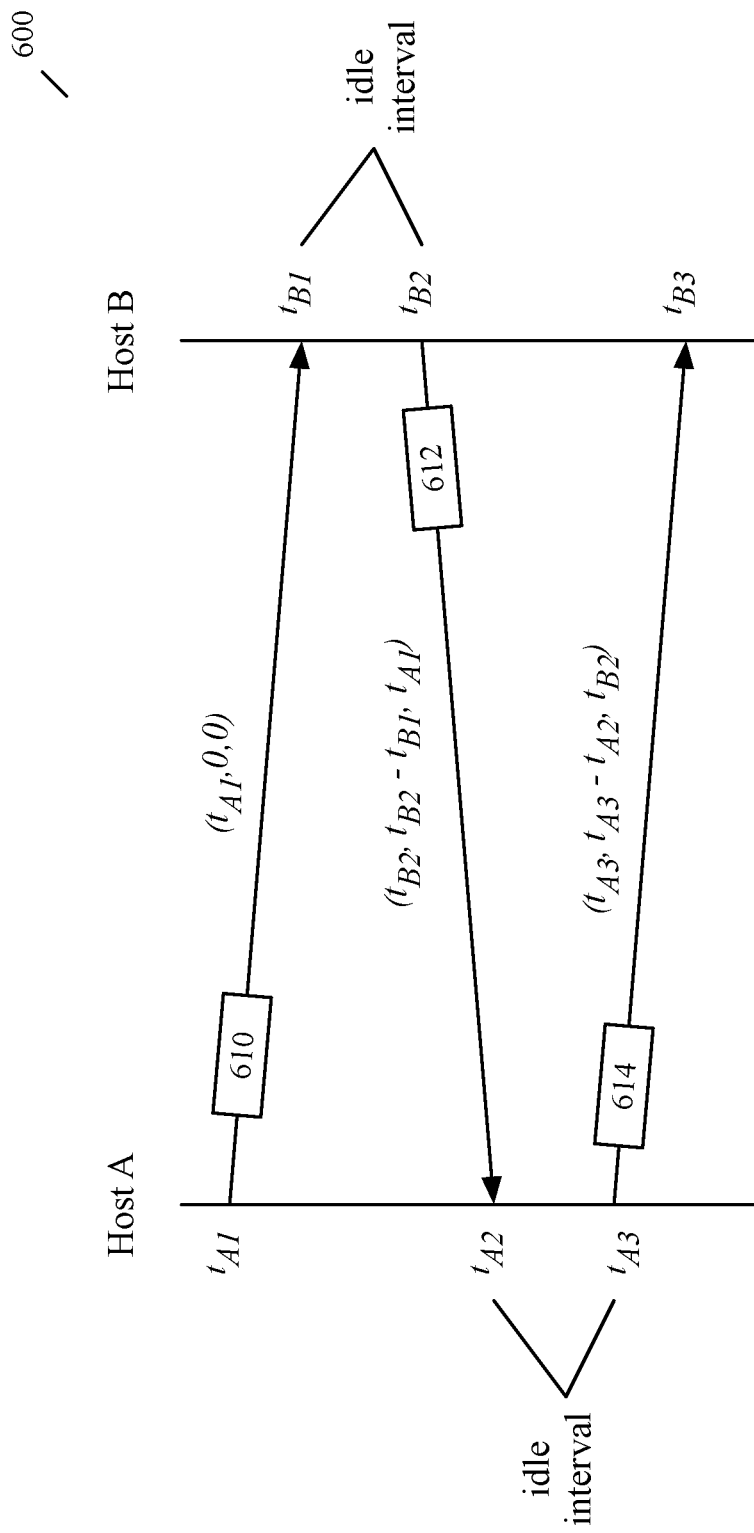
FIG. 6 conceptually illustrates a start of a BFD session between two host computers according to some embodiments.

FIG. 6 illustrates an example of a BFD session using BFD packets with extended fields. As shown, when a first BFD packet 610 is sent by a host A to host B at time $t_{A1}$, the sending timestamp field is populated with a timestamp $t_{A1}$, while the idle interval and piggybacked timestamp have values of "0" (zero), as there is not yet an idle interval or piggybacked timestamp to insert (i.e., $t_{A1}$,0,0) based on receipt and/or forwarding of previous packets in the BFD session. After receiving the BFD packet 610 at time $t_{B1}$, host B forwards at $t_{B2}$ an extended reply packet 612 to the host A. Accordingly, the time between $t_{B1}$ and $t_{B2}$ is the idle interval to be inserted in the reply packet 612. As illustrated, each of the fields of the extended reply packet are populated for the reply packet 612, with $t_{B2}$ representing the sending timestamp, $t_{B2}-t_{B1}$ representing the idle interval, and $t_{A1}$ representing the piggybacked timestamp (i.e., $t_{B2}$, $t_{B2}-t_{B1}$, $t_{A1}$).

When host A receives the reply packet from host B at time $t_{A2}$, host A extracts the sending timestamp from the packet 612 and sends, at $t_{A3}$, an extended reply packet 614 to host B. The extended reply packet 614 includes a sending timestamp $t_{A3}$, an idle interval $t_{A3}-t_{A2}$, and a piggybacked timestamp $t_{B2}$. Accordingly, in some embodiments, each subsequent extended reply packet in any given BFD session would include a sending timestamp, an idle interval corresponding to a time duration on a host between receiving a packet and sending a reply packet, and a piggybacked timestamp of a sending timestamp extracted from a most recently received packet.

In some embodiments, as mentioned above, the timestamps inserted in the extended BFD packets are used to calculate a round-trip time for the path traversed by packets between the host computers. For example, a round-trip time along the network path between host A and host B can be calculated by $t_{A2}-(t_{B2}-t_{B1})-t_{A1}$ (i.e., subtracting the idle interval and piggybacked timestamp from the timestamp corresponding to receipt of the packet). Similarly, using the reply packet 614 from host A to host B, an additional round-trip time may be calculated by $t_{B3}-(t_{A3}-t_{A2})-t_{B2}$.

In some embodiments, these calculated round-trip times may be aggregated and averaged to calculate an average network latency for the path traversed by packets between hosts A and B. In some embodiments, the calculated average network latencies are provided to the controller cluster along with the recorded timestamps. The average is calculated in some embodiments over a duration of time, which is configurable in some embodiments (e.g. by a network administrator). For example, for a flow between hosts A and B that begins at a particular time t1 and ends at time t2, the duration is defined as some fraction of the interval (t2–t1). In this manner, multiple averages may be performed during the lifetime of the flow in order to obtain a more stable estimate of the network latency for the path between hosts A and B.

Figure 7:
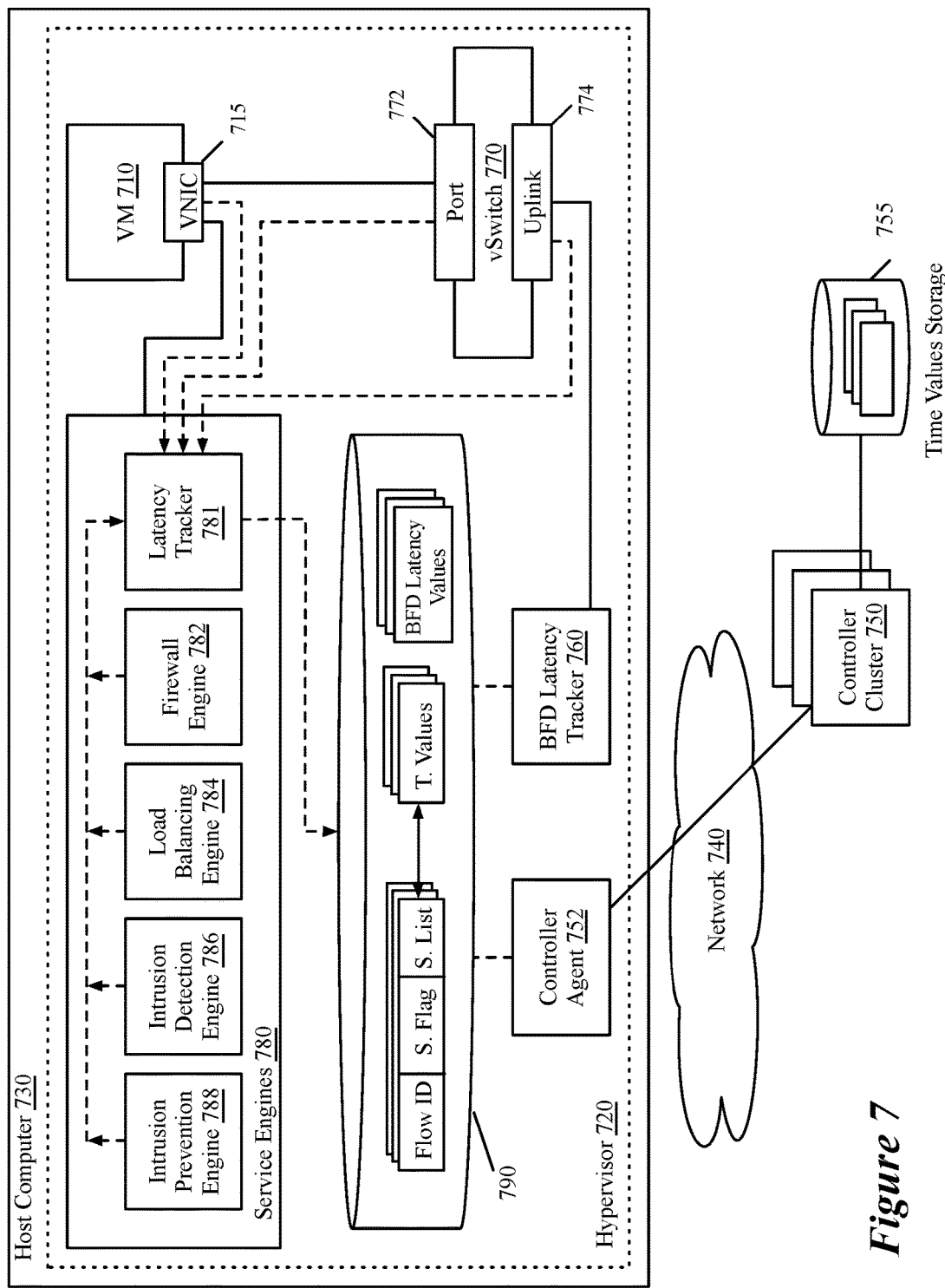
FIG. 7 conceptually illustrates a host computer that includes a set of service engines in an SDDC according to some embodiments.

FIG. 7 illustrates a host computer 730 in an SDDC 700. As shown, host computer 730 includes a hypervisor 720 that includes a VM 710, a vSwitch 770, a set of service engines 780, a latency tracker storage 790, a BFD latency tracker 760, and a controller agent 752. While the BFD latency tracker 760 is conceptually shown outside of the VM 710 to specifically highlight its functionalities and connections, the BFD latency tracker in some embodiments executes on the VM 710.

Outside of the host computer 730, the SDDC 700 additionally includes a controller cluster 750 that connects with the controller agent 752 on the host computer 730 through the network 740. As shown, the controller cluster 750 includes a time values storage 755 for storing time values provided by the host computer 730 (e.g., via the controller agent 752) and other host computers (not shown) in the SDDC 700. In some embodiments, in addition to the time values, the controller cluster 750 stores flow identifiers (e.g., five tuple identifiers), traffic-type identifiers, and any other type of identifiers provided by the controller agents 752 along with the time values.

The set of service engines 780 includes a latency tracker 781, a firewall engine 782, a load balancing engine 784, an intrusion detection engine 786, and an intrusion prevention engine 788. While five (5) service engines are illustrated in this example embodiment, other embodiments may include additional, fewer, or different service engines that those depicted. The set of service engines 780 operate in a kernel space of the hypervisor, according to some embodiments.

The latency tracker 781 receives time values from each of the service engines 782-788, the VNIC 715, the port 772, and the uplink 774 as illustrated by the dashed lines leading from each of these entities to the latency tracker 781. As the latency tracker 781 receives these time values from the various entities, the latency tracker 781 stores the time values in the latency tracker storage 790. Similarly, the BFD latency tracker 760 collects time values from BFD packets exchanged between the host computer 730 and other host computers (not shown) in the SDDC 700 and stores these collected BFD time values in the latency tracker storage 790. The latency tracker storage 790 stores (i) flow identifiers identifying the flows to be sampled (e.g., five tuple identifiers of the flows), (ii) sample flags identifying which packets of these flows are to be sampled, (iii) a list of sampling entities identifying which entities are to identify and store time values associated with performing services on the sampled packets, (iv) a set of time values recorded by the sampling entities, and (v) a set of BFD latency values.

When receiving a packet, the latency tracker 781 in some embodiments performs a process similar to the process 300 described above by first determining whether or not the packet belongs to a flow for which latency is to be tracked and then determining whether the received packet is designated as a sample packet for the flow. If the packet is a sample packet for the flow, the packet's latency is to be tracked. As the packet traverses through the packet processing operations, each of the service engines, in some embodiments, must determine whether it has been designated as an entity that should perform sampling on the packet by recording time values associated with its processing of the packet. In some embodiments, the flag indicating the packet is to be tracked is set by a latency tracker module (e.g., latency tracker 781).

In some embodiments, each time a service engine (i.e., packet processing operation) performs a service on a packet that is to be tracked, the service engine records a time value corresponding to a length of time for performing the service. In other embodiments, the service engine records time values corresponding to when the service operation initiated and when it concluded. After recording these time values, in some embodiments, the service engines provide the recorded time values to the latency tracker 781, which stores the values in the latency tracker storage 790. In some embodiments, the time values are written to disk along with a packet identifier (e.g., a packet header n-tuple) for storage.

Providing the time values to the controller cluster 750 in some embodiments is done by the controller agent 752. The controller agent 752 accesses the time values from the storage 790, and provides them, along with the flow identifiers (e.g., five tuple identifiers of the flows), to the controller cluster 750. When time values are provided to the controller cluster 750, the time values are stored in the time values storage 755. In some embodiments, when the controller cluster 750 receives these time values, the controller cluster 750 performs a process like the process 400 described above.

In some embodiments, as noted in process 400, when the controller cluster 750 receives subsequent sets of time values corresponding to the same flow, the controller cluster calculates a new average latency experienced by the flow by averaging the subsequently received sets of time values with the stored calculated average latency, and stores the new calculated average latency along with the received sets of time values in the time values storage 755. The average latency may be calculated using a cumulative average, a moving average, a weighted average, or other type of average. In order to calculate accurate averages, the controller cluster maintains a current sample count according to some embodiments. Accordingly, in some embodiments, the time values storage 755 includes both time values and calculated latency measurements. Conversely, in other embodiments, the calculated latency measurements are stored in a second storage (not shown) that is separate from the time values storage 755 by the controller cluster 750.

Figure 8:
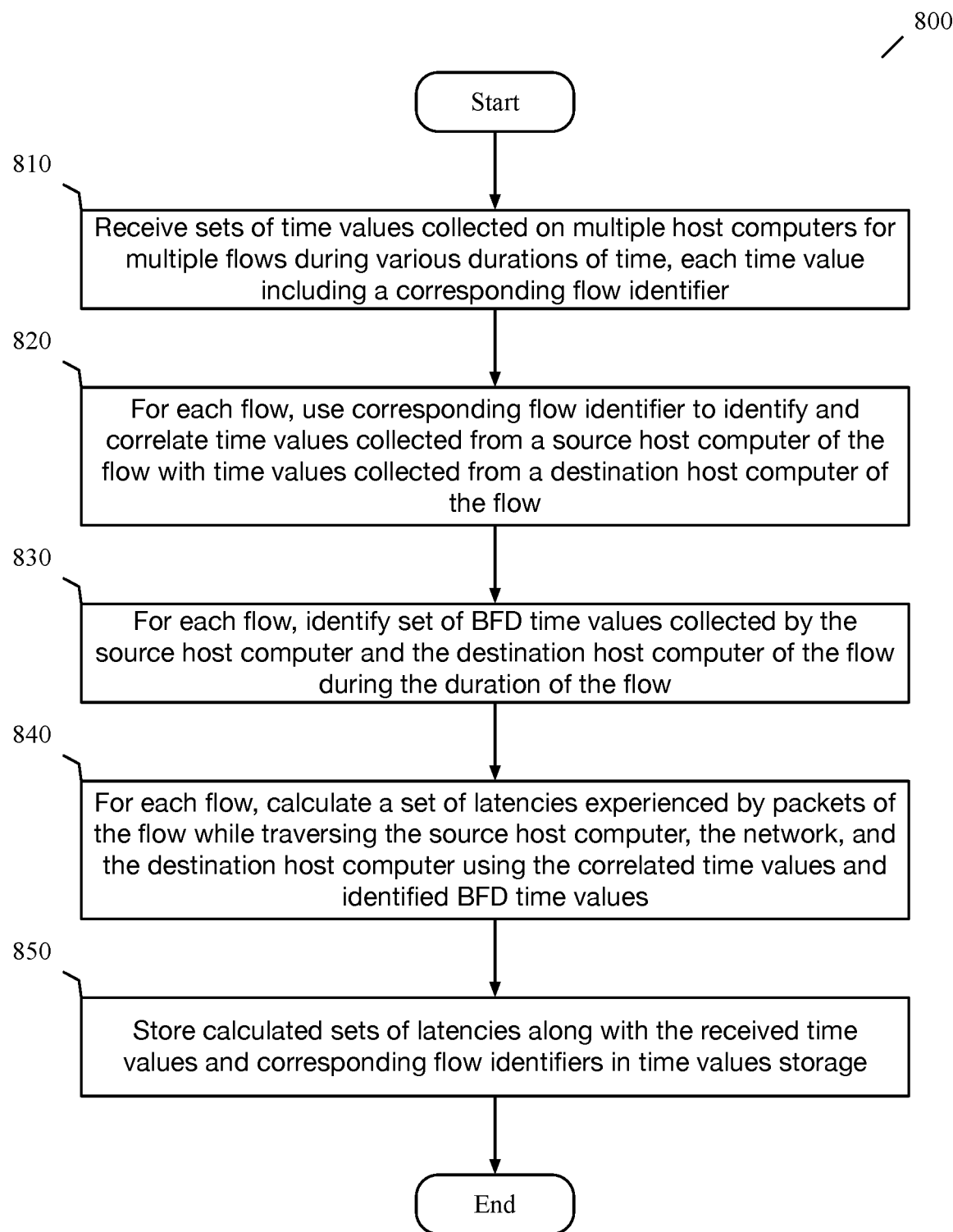
FIG. 8 illustrates a process for a controller cluster for correlating time values received from multiple sources according to some embodiments.

In some embodiments, a controller cluster may receive multiple sets of time values that correspond to a same flow, but are associated with any one or more of different processes, different time intervals, different machines, etc. FIG. 8 illustrates a process 800 performed by a controller cluster (e.g., controller cluster 750) as it receives these multiple sets of time values (e.g., from the controller agent 752). As shown, the process 800 begins at 810 when the controller cluster receives sets of time values collected on multiple host computers for multiple flows during various durations of time, where each time values includes a corresponding flow identifier (e.g., a five tuple identifier of the flow).

Once the process 800 receives the sets of time values, the process proceeds to 820 where for each flow, the corresponding flow identifiers received with the sets of time values are used to identify and correlate time values collected from a source host computer (i.e., the host computer on which the source machine of the flow executes) of a particular flow with time values collected from a destination host computer (i.e., the host computer on which the destination machine of the flow executes) of the particular flow. As a result of correlating the time values, in some such embodiments, average latencies experienced by packets of the flow through the entirety of the path they traverse (e.g., from the VNIC at the source machine to the VNIC at the destination machine) may be calculated (e.g., as described above for FIG. 4).

Next, the process 800 identifies at 830, for each flow, a set of BFD time values collected by the source host computer and the destination host computer of the flow during the duration of the flow. In some embodiments, the controller cluster (e.g., controller cluster 750) stores additional parameters for each flow for associating the BFD time values with the time values of the flow.

Once the process has identified a set of BFD time values for each flow, the process 800 transitions to 840 to calculate, for each flow, a set of latencies experienced by packets of the flow while traversing the source host computer (i.e., from the VNIC of the source machine to the PNIC of the host computer), the network, and the destination host computer (i.e., from the PNIC of the host computer to the VNIC of the destination machine) using the correlated sets of time values collected by the source and destination host computers and the identified BFD time values. This set of latencies may include, for example, overall hypervisor latency (i.e., VNIC to PNIC, or PNIC to VNIC), latencies for individual processes performed on the packets (e.g., firewall engine processing), and network latency (i.e., latency between when packets leave a PNIC of a source host to when packets are received at a PNIC of a destination host).

The time values collected for the flows and the BFD time values, in some embodiments, are received as two distinct sets of time values. The first set of time values according to some embodiments correspond to time values collected by the source and destination host computers of the flow, while the second set of time values correspond to the BFD time values representing transition times of packets between the source and destination host computers (e.g., as described above with reference to FIGS. 5-6). In some embodiments, the first set of time values consists of two subsets, where the first subset of time values are the time values collected at the source host computer and the second subset of time values are the time values collected at the destination host computer. In some such embodiments, the controller cluster creates an association (e.g., a reference in each record to a data structure that stores a related record) between these distinct sets of time values in order to calculate latencies experienced by packets transmitted between different sets of machines. That is, this allows for the controller cluster to compute the latency experienced by packets from the VNIC of the source machine, through the packet processing operations at the source hypervisor to the PNIC of this host, through the physical network to the PNIC of the destination host, and through the packet processing operations at the destination hypervisor to the VNIC of the destination machine.

After the sets of latencies have been calculated at 840, the process 800 transitions to 850 to store the calculated sets of latencies along with the received time values and corresponding flow identifiers in a time values storage (e.g., time values storage 755) for later use. Once the latencies, values, and identifiers have been stored, the process then ends.

In some embodiments, a controller cluster (e.g., controller cluster 750) may receive queries (e.g., from a user through a user interface (UI)) relating to latencies experienced by various flows. In response to these queries, in some embodiments, the controller cluster 750 may provide reports based on stored time values and stored calculated latency measurements. In some embodiments, the controller cluster 750 utilizes the stored parameters and/or stored flow identifiers in generating these latency reports.

Figure 9:
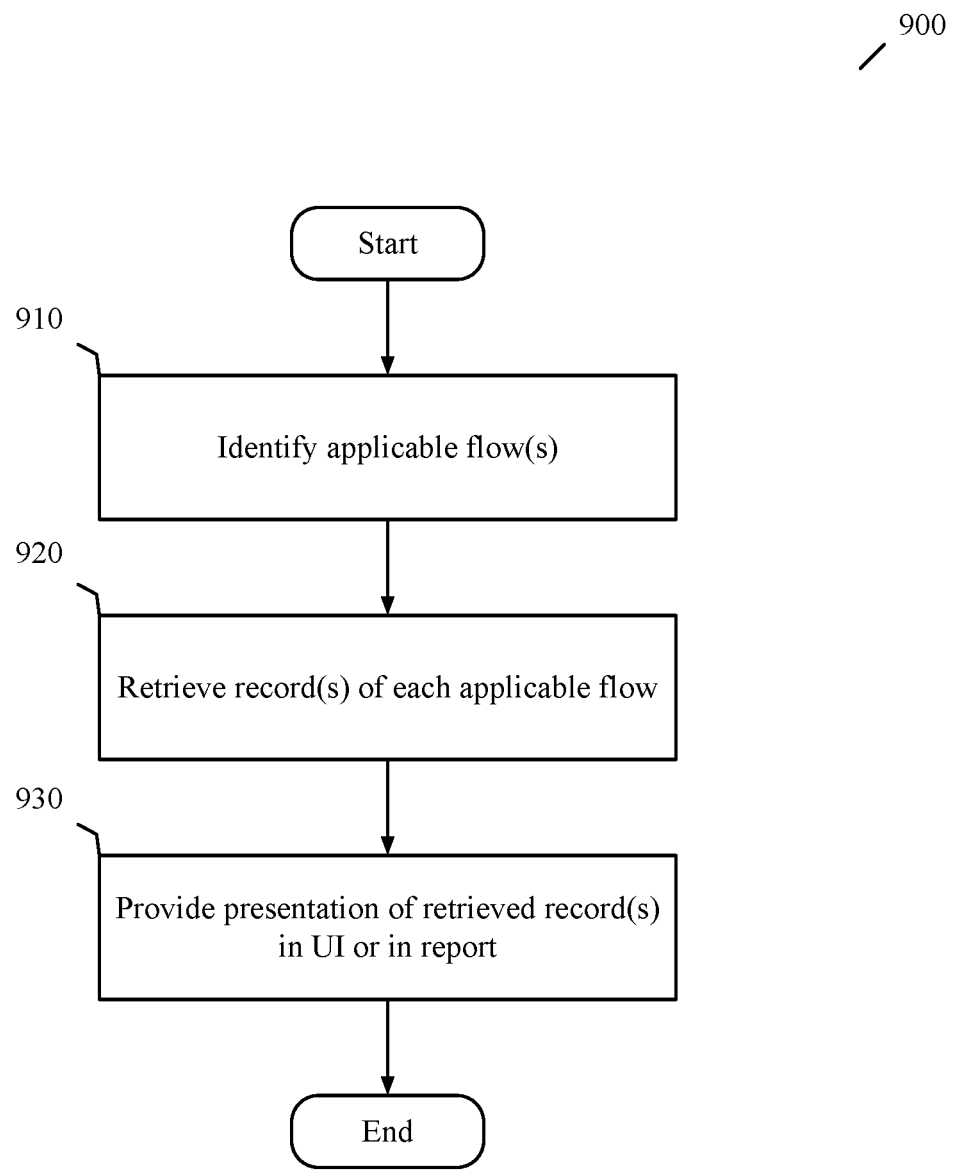
FIG. 9 illustrates a process for processing queries received at a controller cluster according to some embodiments.

FIG. 9 illustrates a process 900 performed by a controller or controller cluster when such a query is received. In various embodiments, such a query may seek records relating to flows between a particular pair of machines (e.g., by specifying source and destination Internet Protocol (IP) addresses of the pair of machines) or of a particular traffic type (e.g., by including a particular traffic-type identifier).

As shown, the process 900 begins at 910 by identifying any applicable flows relating to the query. For example, the controller cluster 750 in the SDDC 700 may check the time values storage 755 to identify any records relating to flows sought by the query. As mentioned above, in addition to time values, the controller cluster 750 in some embodiments stores flow identifiers, traffic type identifiers, and/or other parameters (e.g., provided by the controller agent 752) corresponding to the time values along with the time values in the time values storage 755. Alternatively, as described above with reference to the process 800, the controller cluster 750 may create associations (e.g., references in each record to data structures that store related records) between sets of time values and store parameters (e.g., n-tuple identifiers) along with the time values. The controller cluster 750 uses these various parameters by which the time values are indexed in order to identify flows applicable to the query.

Once the process 900 identifies one or more applicable flows, the process retrieves 920 records for each of the identified applicable flows (e.g., from the time values storage 755). After the process has retrieved the records of each of the identified applicable flows, the process provides, at #930, a presentation of the retrieved records in a UI or a report (e.g., API report).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
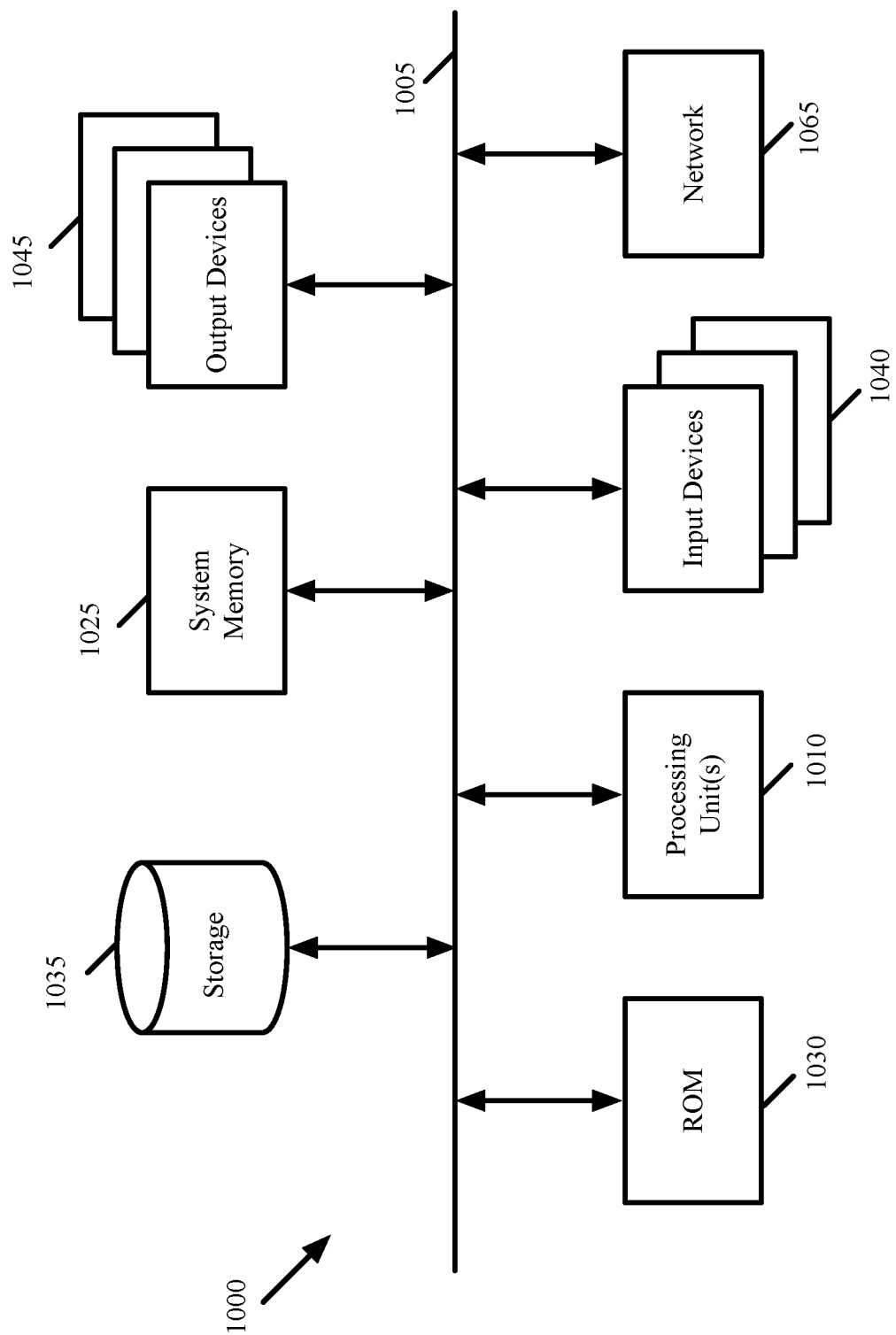
FIG. 10 conceptually illustrates a computer system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random-access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN")), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given may be any type of DCNs, including physical hosts, VMs, non-VM containers, and hypervisor kernel network interface modules. In fact, the example networks might include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3, 4, 8, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method of identifying packet latency in a software defined datacenter (SDDC) comprising a network, a plurality of host computers executing a plurality of machines, and a set of one or more controllers, the method comprising:
at the set of controllers:
receiving, for a packet flow sent from a source machine executing on a source host computer to a destination machine executing on a destination host computer, a first plurality of processing time values comprising at least one processing time value for each packet-processing operation in a first plurality of packet-processing operations performed on the flow at the source host computer and a second plurality of processing time values comprising at least one processing time value for each packet-processing operation in a second plurality of packet-processing operations performed on the flow at the destination host computer;
receiving, for the flow, a plurality of transmission time values associated with packet flow transmission between the source and destination host computers through the SDDC network; and
processing the first and second pluralities of processing time values and the plurality of transmission time values to identify first and second pluralities of processed latencies and a transmission latency, the first plurality of processed latencies including one processed latency value experienced by the flow for each packet-processing operation at the source host computer, the second plurality of processed latencies including one processed latency value experienced by the flow for each packet-processing operation at the destination host computer, and the transmission latency specifying a latency experienced by the flow in the transmission from the source host computer to the destination host computer through the SDDC network.

2. The method of claim 1, wherein each processed latency value for each packet-processing operation at the source or destination host computer is an average latency value that specifies an average latency experienced by the flow due to the packet-processing operation.

3. The method of claim 2 further comprising:
receiving, from the source host computer, an average latency for the flow; and
calculating a subsequent average latency using the received average latency and a stored average latency for the flow.

4. The method of claim 3, wherein the stored average latency comprises an average of at least two prior average latencies received from the source host computer for the flow.

5. The method of claim 1 further comprising associating the first and second pluralities of processed latencies in order to present the latencies experienced by the flow due to the first and second pluralities of packet-processing operations at the source and destination host computers.

6. The method of claim 5 further comprising storing a parameter for the flow for associating the first and second pluralities of processed latencies for the flow.

7. The method of claim 5 further comprising computing, for the flow, each of the plurality of transmission time values from each of a plurality of pairs of source-destination time values, with each pair having one processing time value from the source host computer and one processing time value from the destination host computer.

8. The method of claim 5 further comprising creating an association between the transmission latency and the first and second pluralities of processed latencies.

9. The method of claim 5, wherein the plurality of transmission time values comprise time values representing transmission times for bi-directional forwarding detection (BFD) packets.

10. The method of claim 1 further comprising storing the first and second pluralities of processed latencies and the transmission latency to provide in reports that are responsive to queries relating to latencies experienced by the flow.

11. The method of claim 6, wherein storing the parameter for the flow further comprises storing a flow identifier for the flow.

12. A non-transitory machine readable medium storing a program which when executed by a set of processing units of a controller identifies packet latency in a software defined datacenter (SDDC), the SDDC comprising a network, a plurality of host computers executing a plurality of machines, and at least one controller, the program comprising sets of instructions for:
receiving, for a packet flow sent from a source machine executing on a source host computer to a destination machine executing on a destination host computer, a first plurality of processing time values comprising at least one processing time value for each packet-processing operation in a first plurality of packet-processing operations performed on the flow at the source host computer and a second plurality of processing time values comprising at least one processing time value for each packet-processing operation in a second plurality of packet-processing operations performed on the flow at the destination host computer;
receiving, for the flow, a plurality of transmission time values associated with packet flow transmission between the source and destination host computers through the SDDC network; and
processing the first and second pluralities of processing time values and the plurality of transmission time values to identify first and second pluralities of processed latencies and a transmission latency, the first plurality of processed latencies including one processed latency value experienced by the flow for each packet-processing operation at the source host computer, the second plurality of processed latencies including one processed latency value experienced by the flow for each packet-processing operation at the destination host computer, and the transmission latency specifying a latency experienced by the flow in the transmission from the source host computer to the destination host computer through the SDDC network.

13. The non-transitory machine readable medium of claim 12, wherein each processed latency value for each packet-processing operation at the source or destination host computer is an average latency value that specifies an average latency experienced by the flow due to the packet-processing operation.

14. The non-transitory machine readable medium of claim 13, wherein the program further comprises sets of instructions for:
receiving, from the source host computer, an average latency for the flow; and
calculating a subsequent average latency using the received average latency and a stored average latency for the flow.

15. The non-transitory machine readable medium of claim 14, wherein the stored average latency comprises an average of at least two prior average latencies received from the source host computer for the flow.

16. The non-transitory machine readable medium of claim 12 further comprising associating the first and second pluralities of processed latencies in order to present the latencies experienced by the flow due to the first and second pluralities of packet-processing operations at the source and destination host computers.

17. The non-transitory machine readable medium of claim 16, wherein the program further comprises a set of instructions for storing a parameter for the flow for associating the first and second pluralities of processed latencies for the flow.

18. The non-transitory machine readable medium of claim 16, wherein the program further comprises a set of instructions for computing, for the flow, each of the plurality of transmission time values from each of a plurality of pairs of source-destination time values, with each pair having one processing time value from the source host computer and one processing time value from the destination host computer.

19. The non-transitory machine readable medium of claim 16, wherein the program further comprises a set of instructions for creating an association between the transmission latency and the first and second pluralities of processed latencies.

20. The non-transitory machine readable medium of claim 16, wherein the plurality of transmission time values comprise time values representing transmission times for bi-directional forwarding detection (BFD) packets.

21. The non-transitory machine readable medium of claim 12, wherein the program further comprises a set of instructions for storing the first and second pluralities of processed latencies and the transmission latency to provide in reports that are responsive to queries relating to latencies experienced by the flow.

22. The non-transitory machine readable medium of claim 17, wherein the set of instructions for storing the parameter for the flow further comprises a set of instructions for storing a flow identifier for the flow.

* * * * *